(No Model.)
E. T. STARR.
DEVICE FOR REGULATING THE FLOW OF ELECTRIC CURRENTS.
No. 357,873. Patented Feb. 15, 1887.
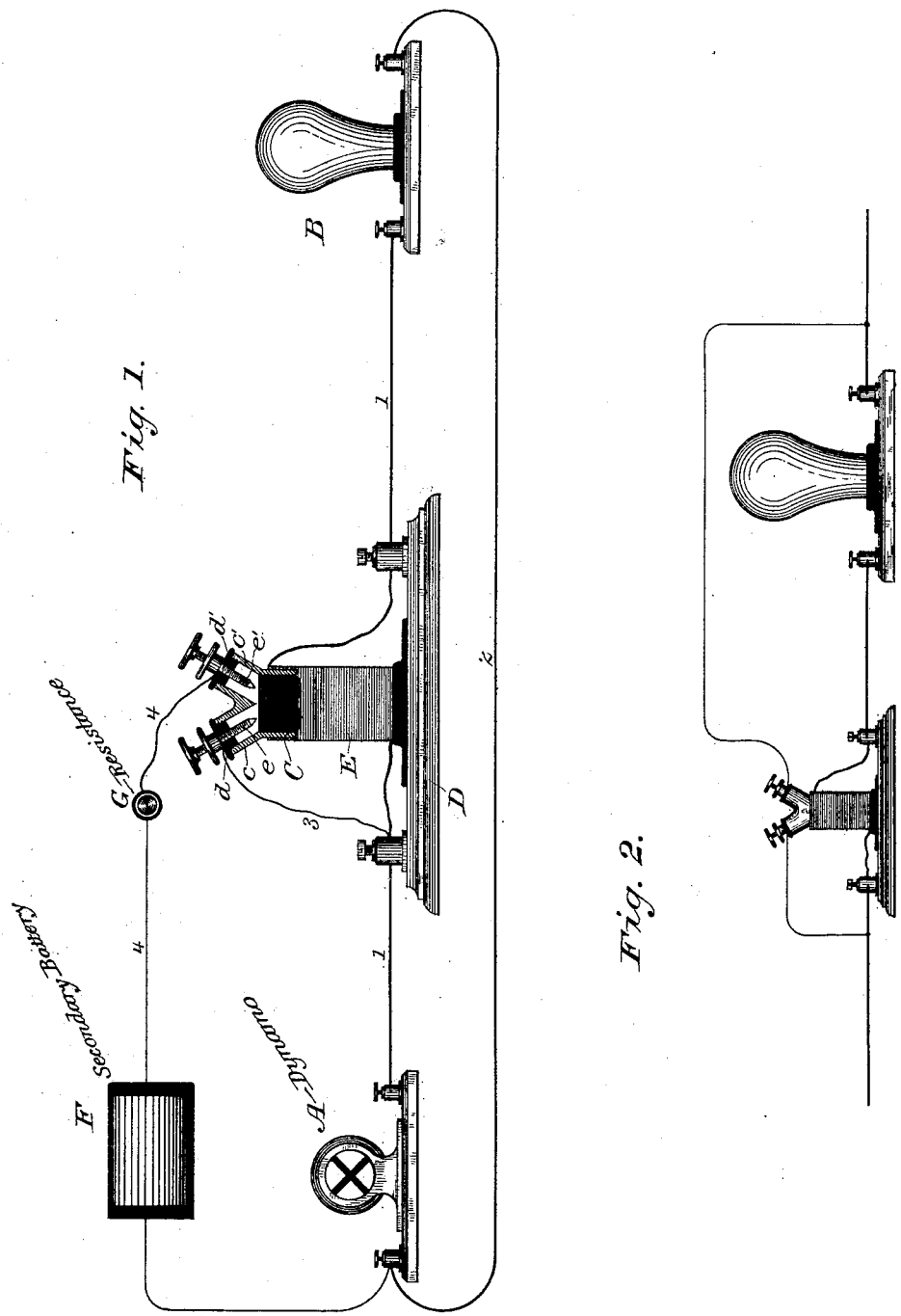
WITNESSES
Wm. A. Skinkle
Jos. S. Latimer
INVENTOR
Eli. T. Starr,
By his Attorneys
Baldwin, Hopkins & Peyton

United States Patent Office.

ELI T. STARR, OF PHILADELPHIA, PA., ASSIGNOR, BY MESNE ASSIGNMENTS, TO THE ELECTRICAL ACCUMULATOR COMPANY, OF NEW YORK.

DEVICE FOR REGULATING THE FLOW OF ELECTRIC CURRENTS.

SPECIFICATION forming part of Letters Patent No. 357,873, dated February 15, 1887.

Application filed December 3, 1881. Renewed January 8, 1887. Serial No. 223,824. (No model.)

*To all whom it may concern:*

Be it known that I, ELI T. STARR, of the city and county of Philadelphia, in the State of Pennsylvania, have invented certain new and useful Improvements in the Art of Governing or Regulating the Flow of Electric Currents over Conducting-Wires and in Apparatus therefor, of which the following is a specification.

The great danger of fire to buildings, &c., resulting from the overcharging of conducting-wires of electric-lighting apparatus with currents of electricity of high tension has excited much attention among electricians and others especially interested in the use of electric lights. When the wires are too highly charged, the resistance to the passage of the electric current, either at certain portions of the wire or throughout its whole length, causes the wire to become highly heated and capable of setting fire to inflammable substances in close proximity to or in contact with it. Fires, dangerous to life and property, must therefore necessarily follow as incident to the extended use of the electric light unless provision be made to avoid overcharging or overheating of the conducting-wires. I am of opinion that insulation of the wires will not avoid the danger in a great many cases.

The object of my present invention more especially is to prevent the conducting-wires of electric lighting and other electrical apparatus from becoming overcharged and heated to such a degree as to be liable to set fire to inflammable substances—such as the wood-work of buildings, for example—with which the wires are in contact, and to insure a uniform flow of current through the circuit, notwithstanding variations due to the source of electricity.

My invention consists in certain combinations and organizations of parts or devices, which are particularly recited at the close of the specification, and some of the improvements claimed by me may be used without the others.

In the accompanying drawings, Figure 1 is a view of my improved electric-current governing or regulating apparatus and its combination in an electric circuit, and Fig. 2 is a view of said apparatus arranged in an electric circuit for a purpose different from that of the organization illustrated by Fig. 1.

A dynamo-electric machine or mechanical generator of electric currents is represented at A, and an electric lamp at B. The current generated by the dynamo-electric machine is conducted to the lamp B by means of a main line or wire, 1, and returns by way of wire 2 in the example shown.

In order to govern or regulate the current so that it shall not be of such intensity as to heat the main conducting wire or wires to a dangerous extent, I interpose a governor or regulator in the circuit. Said governor is so organized that when the current being thrown upon the wire is of such intensity as to exceed the capacity of the wire to carry it without overheating, the surplus will be carried off to the ground or to storage-batteries to charge them, and the conducting-wire thus relieved. Said governor or regulator preferably consists of a tubular vessel or jar, C, of glass or other suitable material which is a good conductor of heat and a poor conductor of electricity. The vessel or jar is mounted at its lower end upon an insulated base or stand, D, and at its upper end is divided or branched, so as to have two necks, $c\ c'$, of smaller diameter than the body of the vessel, so that said vessel may be said to be a branched or double-necked vessel or jar. In the respective necks $c\ c'$ of the vessel or jar C are inserted stoppers $d\ d'$, of hard rubber, for example, and passing centrally through said stoppers are adjustable metallic screws $e\ e'$, the lower or inner ends of which reach down in the body of the vessel or jar to a point, for example, about where the necks begin.

The vessel or jar C is preferably nearly filled—say to a point a short distance below the ends of the screws $e\ e'$—with mercury, which is very sensitive to heat and readily expands, while at the same time it is a good conductor of electricity.

A resistance-coil, E, encircles the body of the vessel or jar C, and forms part of the main line or circuit through which the current passes to the lamp B, for example. This resistance-coil, or any well-known equivalent therefor, is introduced into the circuit so as to offer at that point the most resistance to the passage of the electric current, and consequently develop at that point, also, the most heat, due to the passage of the current.

It will be understood, of course, that the form or shape of the vessel C may be altered.

It is intended that the capacity of the line or conducting wires relatively to the generator is to be so determined that the line will carry all the current thrown upon it necessary to do the work required without being dangerously heated. If, however, more electricity or electricity of greater intensity is developed or thrown upon the line than the line can carry without overheating or dangerous heating, the surplus current will be conveyed away from the main line at the point where the governor or regulator is inserted, and said main line will thus continue safe, and without the capability of firing substances in its vicinity, while still receiving effective current to do the work required.

When the intensity of the current is augmented to a dangerous degree, the resistance-coil will first become overheated, due to the fact that it offers greater resistance to the passage of the current than the rest of the line, and the heat thus developed will heat the vessel or jar of the governor, causing the mercury to expand and rise in contact with the lower ends of the screws $e$ $e'$, thus completing an electrical connection between said screws. A portion of the electric current (the surplus) will then pass, by way of the supplemental or branch wire 3, screw $e$, mercury or conducting-liquid, screw $e'$, and wire 4, to a storage or secondary battery, F, to charge said battery. Instead of the surplus current passing to a storage-battery, it may pass directly to the ground, or be otherwise directed through the branch circuit to relieve the main conducting wires or line.

It will thus be understood that I have a main circuit, a governor or regulator in the main circuit, and a supplemental or branch circuit to carry off a portion of the electricity when its tension becomes too great for safety, and it will also thus be apparent that the lamp receives a uniform flow of current. It will also be understood, of course, that the conductivity of the main line is greater than that of the supplemental or branch line, and that no current can flow through the branch circuit save when the circuit is completed through the mercury. It is only when the resistance-coil develops considerable heat to close the branch circuit through the mercury that the branch line is brought into requisition to "bleed" the current and carry off its dangerous surplus. As soon as the current reaches a normal intensity the resistance-coil loses a portion of its heat and the mercury descends, thus opening the branch circuit to permit all the current to flow through the main line.

I contemplate introducing into the branch or supplemental circuit a resistance-coil, G, or an equivalent thereof, in order to regulate the quantity of electricity to be conducted off when the supplemental circuit is closed. By this means a constant current will still be maintained upon the main line sufficient to operate the lamp.

In Fig. 2 I have shown my improved governor as employed in a circuit with an electric lamp, in order that when the current reaches an intensity which may injure the lamp or its apparatus by fusion or heat it may close a short or shunt circuit to convey the dangerous excess of current to the main line beyond the lamp. I wish it to be understood, however, that protecting electric lamps by a short or shunt circuit is not, broadly considered, of my invention.

I claim as of my invention—

1. The combination, substantially as hereinbefore set forth, of a source of electricity, a main circuit including said source, an external heating device included in said circuit, a vessel containing a fluid expansible under the action of the heat of said heating device, which is external to said vessel, a branch or shunt circuit, and the circuit-controlling devices of said branch or shunt circuit controlled by said fluid, as before set forth.

2. An electric governor consisting of a vessel containing an expansible and contractible medium, a heating device external to said vessel and acting therethrough upon said medium, and circuit-controlling devices controlled by said medium, substantially as described.

3. The electric governor, substantially as hereinbefore set forth, consisting of the combination of a vessel containing a fluid expansible under the action of heat, contact points or screws in close proximity to said fluid, and a resistance-coil to heat said vessel, expand the fluid, and make an electrical connection between said contact points or screws.

In testimony whereof I have hereunto subscribed my name this 26th day of November, A. D. 1881.

ELI T. STARR.

Witnesses:
E. EUGENE STARR,
ALFRED LAMBORN.